United States Patent
Xu et al.

(10) Patent No.: US 11,966,822 B2
(45) Date of Patent: Apr. 23, 2024

(54) FEATURE PROCESSING FOR MACHINE LEARNING

(71) Applicant: International Business Machines Corporation, Armonk, NY (US)

(72) Inventors: Chun Lei Xu, Xi'an (CN); Si Er Han, Xi'an (CN); Shi Bin Liu, Xi'an (CN); Yi Shao, Xi'an (CN); Lei Tian, Xi'an (CN); Hao Zheng, Xi'an (CN); Jia Rui Wang, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 869 days.

(21) Appl. No.: 17/035,699

(22) Filed: Sep. 29, 2020

(65) Prior Publication Data

US 2022/0101183 A1 Mar. 31, 2022

(51) Int. Cl.
| | | |
|---|---|---|
| *G06F 18/22* | (2023.01) | |
| *G06F 18/213* | (2023.01) | |
| *G06N 20/00* | (2019.01) | |
| *G06V 10/77* | (2022.01) | |

(52) U.S. Cl.
CPC ........... *G06N 20/00* (2019.01); *G06F 18/213* (2023.01); *G06F 18/22* (2023.01); *G06V 10/7715* (2022.01)

(58) Field of Classification Search
CPC ........ G06N 20/00; G06F 18/22; G06F 18/213
See application file for complete search history.

(56) References Cited

U.S. PATENT DOCUMENTS

| | | | |
|---|---|---|---|
| 6,134,541 A | 10/2000 | Castelli | |
| 6,671,404 B1 | 12/2003 | Kawatani | |
| 7,558,680 B2 | 7/2009 | Declerck | |
| 7,567,972 B2 | 7/2009 | Geiselhart | |
| 8,194,077 B2 | 6/2012 | Lecerf | |
| 11,145,416 B1* | 10/2021 | Hafez | G16B 20/00 |
| 2005/0282175 A1* | 12/2005 | Taylor | G06V 10/7715 382/128 |
| 2014/0052677 A1* | 2/2014 | Wagner | G06N 5/01 706/13 |
| 2015/0074130 A1 | 3/2015 | Kimmel | |
| 2017/0277853 A1* | 9/2017 | Carlson | G16H 50/30 |
| 2019/0287388 A1* | 9/2019 | Salti | G06F 18/2411 |

(Continued)

OTHER PUBLICATIONS

"Isomap", Wikipedia, last edited on May 5, 2020, 3 pages, <https://en.wikipedia.org/wiki/Isomap>.

(Continued)

*Primary Examiner* — Beau D Spratt
(74) *Attorney, Agent, or Firm* — Michael A. Petrocelli

(57) ABSTRACT

Disclosed are a computer-implemented method, a system and a computer program product for feature processing. In the computer-implemented method for feature processing, two input features selected from multiple features of each sample in a sample set are projected to one resulting feature by one or more processing units based on a specified curve. The sample set is updated by replacing the two input features with the one resulting feature for each sample in the sample set by one or more processing units. The projecting and the updating for the sample set are repeated by one or more processing units until the number of features of each sample in the sample set reaches a predetermined criterion.

18 Claims, 10 Drawing Sheets

(56) References Cited

U.S. PATENT DOCUMENTS

2021/0217524 A1* 7/2021 Vos ........................ G16H 50/20

OTHER PUBLICATIONS

"Nonlinear dimensionality reduction", Wikipedia, last edited on Sep. 24, 2020, 14 pages, <https://en.wikipedia.org/wiki/Nonlinear_dimensionality_reduction>.

"Principal component analysis", Wikipedia, last edited on Sep. 23, 2020, 25 pages, <https://en.wikipedia.org/wiki/Principal_component_analysis>.

"T-distributed stochastic neighbor embedding", Wikipedia, last edited on Sep. 24, 2020, 3 pages, <https://en.wikipedia.org/wiki/T-distributed_stochastic_neighbor_embedding>.

Mell et al., "The NIST Definition of Cloud Computing", National Institute of Standards and Technology, Special Publication 800-145, Sep. 2011, 7 pages.

Safavi, et al., "Progressive Dimensionality Reduction for Hyperspectral Imagery", Proceedings of SPIE—The International Society for Optical Engineering, vol. 7455, 745508, Aug. 2009, 12 pages, <https://www.researchgate.net/publication/241538160>.

Yan, et al., "A scalable supervised algorithm for dimensionality reduction on streaming data", Information Sciences 176, Jul. 22, 2006, pp. 2042-2065, <https://www.sciencedirect.com/science/article/pii/S0020025505003063>.

* cited by examiner

FEATURE PROCESSING FOR MACHINE LEARNING

BACKGROUND

The present disclosure relates to feature processing, and more specifically, to dimensionality adjustments for feature processing in machine learning contexts.

In many fields such as AI, machine learning and data mining, it is important to deal with sample sets with a plurality of features, i.e., high dimensional sample sets. A feature in a given sample set is an individual measurable property or characteristic of a phenomenon being observed. Dimensionality reduction, or dimension reduction, is a process for modifying data from a high-dimensional space into a low-dimensional space such that the low-dimensional representation retains some meaningful properties of the original data.

SUMMARY

According to one embodiment of the present disclosure, there is provided a computer-implemented method for feature processing. In this method, one or more processing units project two input features selected from multiple features of each sample in a sample set to one resulting feature based on a specified curve. One or more processing units update the sample set by replacing the two input features with the one resulting feature for each sample in the sample set. One or more processing units repeat the projecting and the updating for the sample set until the number of features of each sample in the sample set reaches a predetermined criterion.

According to another embodiment of the present disclosure, there is provided a system for feature processing. The system comprises one or more processors, a memory coupled to at least one of the processors and a set of computer program instructions stored in the memory. When executed by at least one of the processors, the set of computer program instructions perform following actions of: projecting two input features selected from multiple features of each sample in a sample set to one resulting feature based on a specified curve; updating the sample set by replacing the two input features with the one resulting feature for each sample in the sample set; and repeating the projecting and the updating for the sample set until the number of features of each sample in the sample set reaches a predetermined criterion.

According to a yet another embodiment of the present disclosure, there is provided computer program product for feature processing. The computer program product comprises a non-transitory computer readable storage medium having program instructions embodied therewith. The program instructions are executable by a processor to cause the processor to perform following actions of: projecting two input features selected from multiple features of each sample in a sample set to one resulting feature based on a specified curve; updating the sample set by replacing the two input features with the one resulting feature for each sample in the sample set; and repeating the projecting and the updating for the sample set until the number of features of each sample in the sample set reaches a predetermined criterion.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
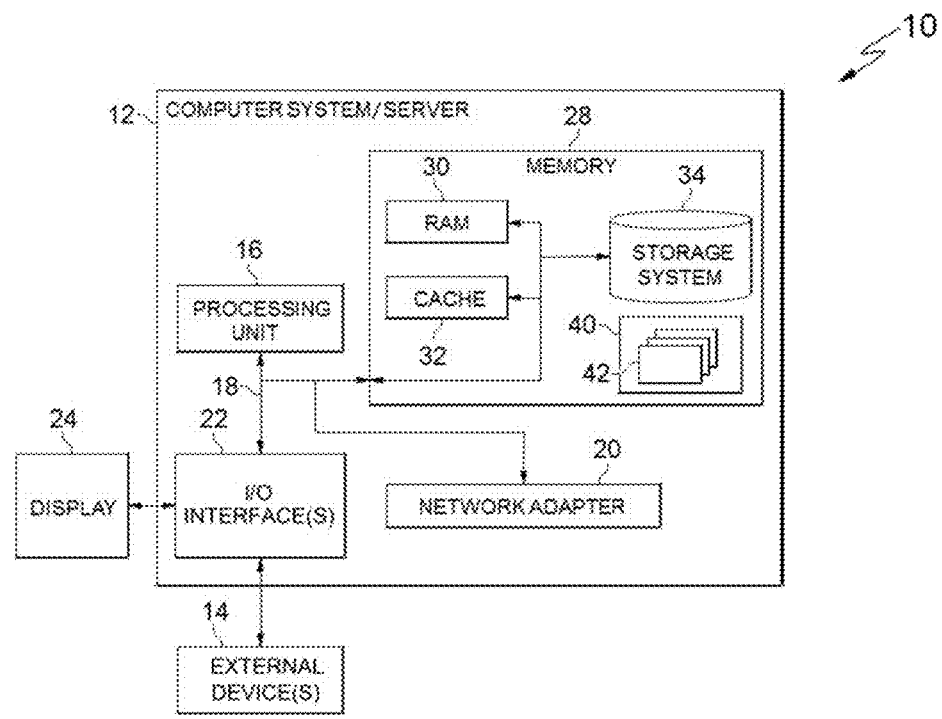
FIG. 1 depicts a cloud computing node according to an embodiment of the present disclosure.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
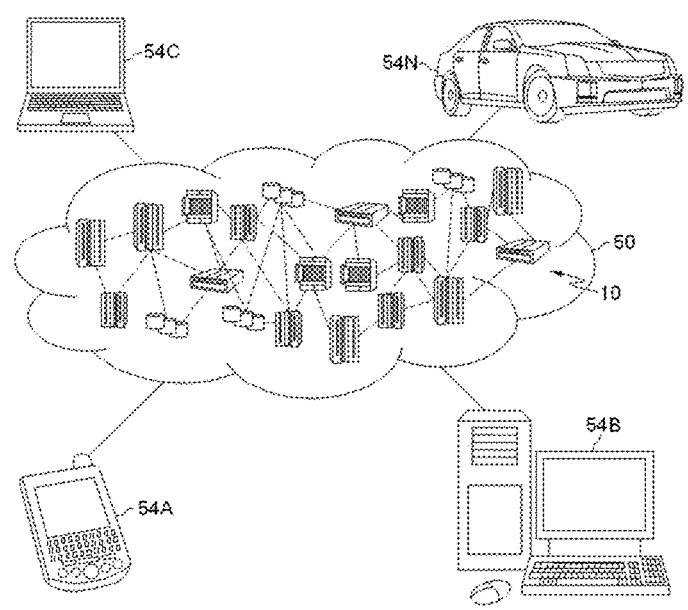
FIG. 2 depicts a cloud computing environment according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
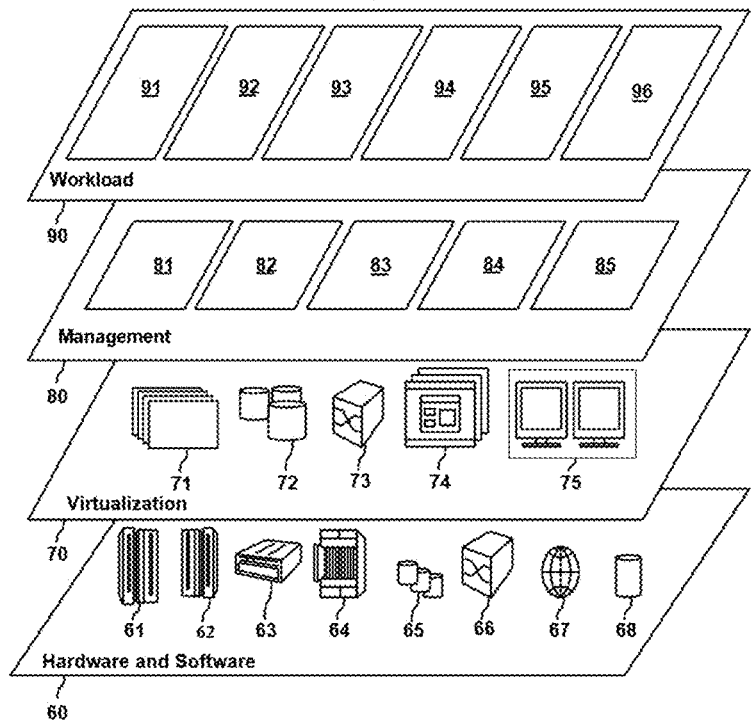
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and feature processing 96.

FIG. 3 depicts abstraction model layers according to an embodiment of the present disclosure. The functional abstraction layers in FIG. 3 are only for illustration. When necessary, one or more layers can be added thereto, and one or more layers in FIG. 3 can be merged or omitted. In addition, in each layer of FIG. 3, some components can be omitted or merged, and one or more components can be added.

It is usually hard or requires tremendous memory and processing power to directly process a high dimensional sample set, especially when there are lots of samples in the set. When processing a high dimensional sample set, it is essential and basically a first step to reduce the number of features of each sample. A number of solutions have been proposed for reducing the number of features of a sample set. However, there are some problems in the existing solutions. For example, some solutions may lose too much information during dimension reduction, and some solutions may be limited to some specific application cases. Therefore, there is a need for more effective and universal solutions for feature processing, in order to reduce the number of features in a high dimensional sample set.

Embodiments of the present disclosure propose a method, system and computer program product for feature processing, which can be more effective and universal in reducing the number of features in a high dimensional sample set.

Herein, a sample set can comprise one or more samples, and each sample can consist of one or more features. When each sample in a sample set has more than one feature, the sample set may be referred to as a high dimensional sample set. The samples can be extracted from an object to be processed, such as an image, a video, a text, a voice, an apparatus or the like. The feature can refer to an attribute of a sample in a sample set, and each feature has a value to describe the attribute. For example, if samples of a sample set are extracted from an image for image processing, then each sample in the sample set can be related to a pixel or a pixel block consisting of multiple pixels in the image, and the features of each sample can be texture, color, shape, etc. of the pixel or the pixel block. If a sample set is related to meteorological data, then each sample in the sample set can be meteorological data of one day, and the features can be temperature, humidity pressure, etc. of the day. As understood by the skilled in the art, the number of features for different samples is the same in a sample set, and the respective features of different samples in the sample set refer to the same attributes correspondingly. The above mentioned terms of "sample set", "sample" and "feature" will be further illustrated by way of example with respect to FIG. 4.

Figure 4:
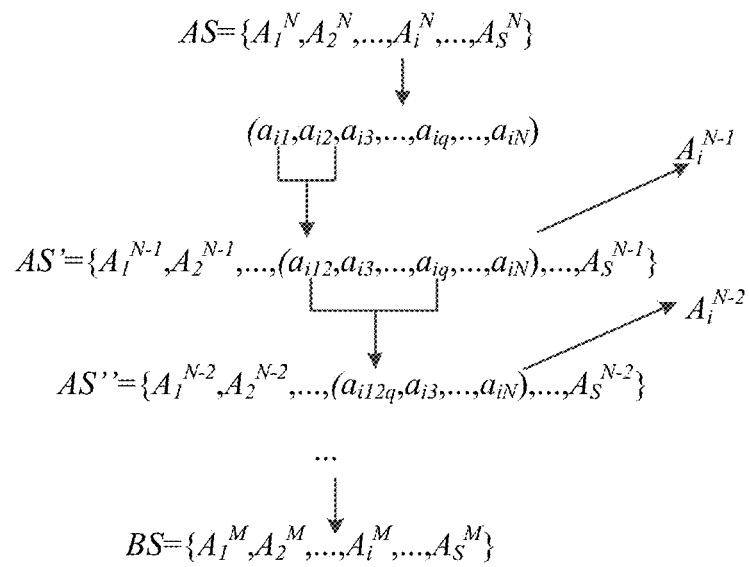
FIG. 4 depicts a schematic diagram of feature processing performed by a method or a system according to an embodiment of the present disclosure.

FIG. 4 depicts a schematic diagram of feature processing performed by a method or a system according to an embodiment of the present disclosure. In FIG. 4, it is assumed that the sample set to be processed is $AS=\{A_1^N, A_2^N, \ldots, A_i^N, \ldots, A_S^N\}$, where $A_i^N$ ($1 \leq i \leq S$) is a sample in the sample set AS, S is an integer representative of the number of samples in the sample set AS, and N is an integer larger than 1, representative of the number of features of each sample $A_i^N$ in the sample set AS. Each sample $A_i^N$ can consist of N features from $a_{i1}$ to $a_{iN}$, i.e., $A_i^N=(a_{i1}, a_{i2}, \ldots, a_{iq}, \ldots, a_{iN})$ ($1 \leq q \leq N$), where $a_{iq}$ represents the $q^{th}$ feature of the $i^{th}$ sample. The $q^{th}$ feature of different samples in the sample set AS can refer to the same attribute. As an example, assuming that a sample set AS is related to image recognition, a sample $A_i^N$ in the sample set can be related to a pixel or a pixel block consisting of multiple pixels in an image and consist of features $a_{i1}, a_{i2}, \ldots, a_{iq}, \ldots, a_{iN}$, representing for example texture, color, shape, etc. respectively. Further, features $a_{11}, a_{21}, \ldots, a_{i1}, \ldots, a_{S1}$ can represent the same attribute such as texture, features $a_{12}, a_{22}, \ldots, a_{i2}, \ldots, a_{S2}$ can represent the same attribute such as color, and so on. All the samples $A_1^N, A_2^N, \ldots, A_i^N, \ldots, A_S^N$ in the sample set AS can correspond to all the pixels or all the pixel blocks in the image respectively.

As shown in FIG. 4, based on the method or system according to an embodiment of the present disclosure, the number of features of each sample in the sample set can be reduced progressively by one at one time, that is, the dimensions of the sample set can be reduced progressively, resulting updated sample sets AS', AS", ..., BS, where BS is an output sample set whose dimensions satisfy a predetermined criterion. The dimensions of AS' are less than that of AS by one, the dimensions of AS" are less than that of AS' by one, and so on. For example, features $a_{i1}$ and $a_{i2}$ of a sample $A_i^N$ in the original sample set AS can be reduced into a new feature $a_{i12}$ based on a specified curve C1, and the sample $A_i^N$ can be reduced into a sample $A_i^{N-1}$ whose number of features is reduced by one as compared with the original sample $A_i^N$. The operation is done for each sample in the sample set AS and an updated sample set AS' is generated accordingly. Next, for example, features $a_{i12}$ and $a_{iq}$ of the sample $A_i^{N-1}$ in the sample set AS' are reduced into a new feature $a_{i12q}$ based on a specific curve C2, and the sample $A_i^{N-1}$ can be reduced into a sample $A_i^{N-2}$ whose number of features is reduced by one as compared with the sample $A_i^{N-1}$. The above operation is done for each sample in the sample set AS' and an updated sample set AS" is generated accordingly. It should be noted that the curves C1 and C2 can be specified, and can be the same or different. During dimension reduction, some of the information of the samples may be lost. For example, some distributed samples in the sample set may be mixed after dimension reduction. According to embodiments of the present disclosure, the curve for each reduction step can be specified, so it is possible to utilize a suitable curve in each reduction step to avoid too much information being lost in the process. For example, the above curves can be specified from a curve library, and a predetermined condition can be applied to evaluate the result of each reduction step with a specified curve. If the result does not satisfy the condition, another curve can be specified to replace the current curve until a result satisfying the condition is found. Further details concerning specifying curves and the predetermined condition will be described later with embodiments. The above process of feature processing will continue until the number of features of each sample of the updated sample set reaches a predetermined criterion, and then the updated sample set satisfying the predetermined criterion will be output, which is noted as the output sample set BS herein. As for the predetermined criterion, for example, it can be that the number M of features of the updated sample set BS is or is lower than a predetermined number K, where K can be any integer larger than or equal to 1 and smaller than N, or that the ratio of the number M of features of the updated sample set BS to the number N of features of the original sample set AS is or is lower than a predetermined ratio such as 50%, 20% or the like.

As can be understood by the above description based on FIG. 4, according to the method or system for feature processing according to an embodiment of the present disclosure, the dimensions of a sample set can be reduced based on specified curves progressively, resulting in an effective solution for dimension reduction of high dimensional sample sets. For example, more information of the samples can be remained after the process by specifying a suitable curve for each reduction step. Further, the number of features of the output sample set can be easily adjusted case by case, which is more flexible for different applications. Meanwhile, the method or system has no limitations on data types, and thus it can be used universally, for example, for both non-linear data and linear data. In addition, the method or system needs no training and works progressively, leading to low CPU and memory requirements.

It should be noted that the method or system for feature processing according to an embodiment of the present disclosure could be implemented by computer system/server 12 or processing unit 16 of FIG. 1. Embodiments of the present disclosure focus on implementations of various functions of the method, system and computer program product for feature processing, which can be used in the process of various fields, such as data mining, AI, machine learning and so on.

Figure 5:
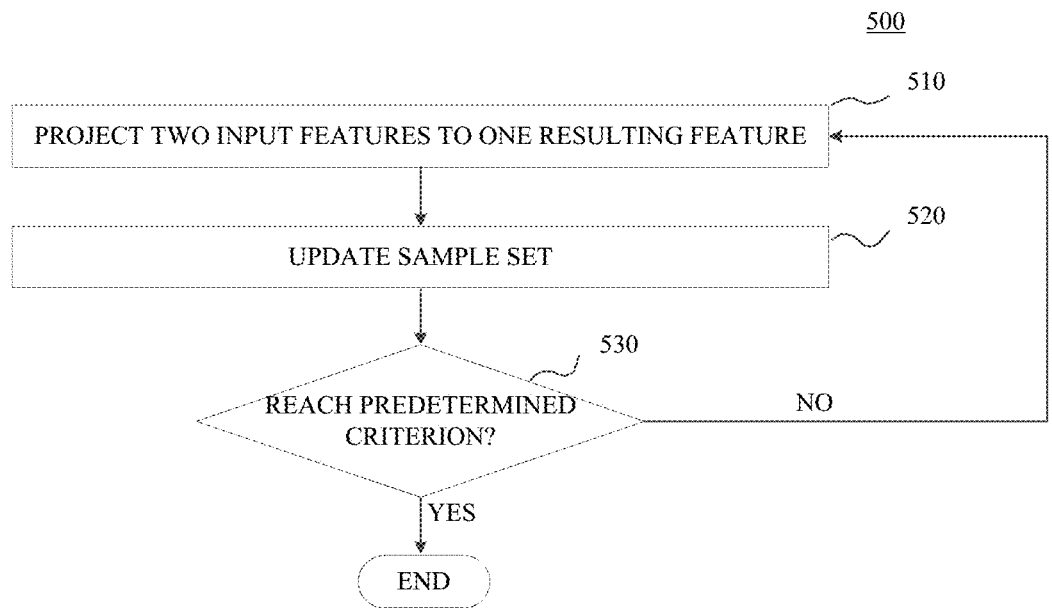
FIG. 5 depicts a flowchart of a method for feature processing according to an embodiment of the present disclosure.

Referring now to FIG. 5, it is shown a flowchart of a method 500 for feature processing according to an embodiment of the present disclosure. The method 500 can be implemented by one or more processing units, for example, implemented by computer system/server 12 or processing unit 16 of FIG. 1. As shown in FIG. 5, at step 510, two features can be selected from multiple features of each sample in a sample set as input features, and projected to one feature based on a specified curve as a resulting feature. For example, features $a_{i1}$ and $a_{i2}$ of sample $A_i^N$ can be projected to one resulting feature $a_{i12}$. At step 520, the sample set can be updated by replacing the two input features $a_{i1}$ and $a_{i2}$ with the one resulting feature $a_{i12}$ for each sample $A_i^N$ in the sample set. For example, the sample set AS is updated to the sample set AS'. At step 530, it can be determined whether the number of features of each sample in the sample set reaches a predetermined criterion. If it is determined that the number of features of each sample in the sample set does not reach the predetermined criterion, the method 500 can return to step 510 to repeat the projecting and the updating for the updated sample set in steps 510 and 520. For example, the projecting and the updating are performed iteratively to the updated sample set AS', AS'', and so on. If it is determined that the number of features of each sample in the sample set reaches the predetermined criterion, the method 500 can end and the updated sample set reaching the predetermined criterion can be taken as an output sample set. For example, if the predetermined criterion is that the number of features of the updated sample set is 2, then when the number of features of the updated sample set reaches 2, the iteration stops and the resulting 2 dimensional sample set is taken as the output sample set. It can be seen from the above steps of method 500 that the number of features of each sample in the sample set is reduced progressively, i.e., reduced by one each time when steps 510 and 520 are performed.

Figure 6:
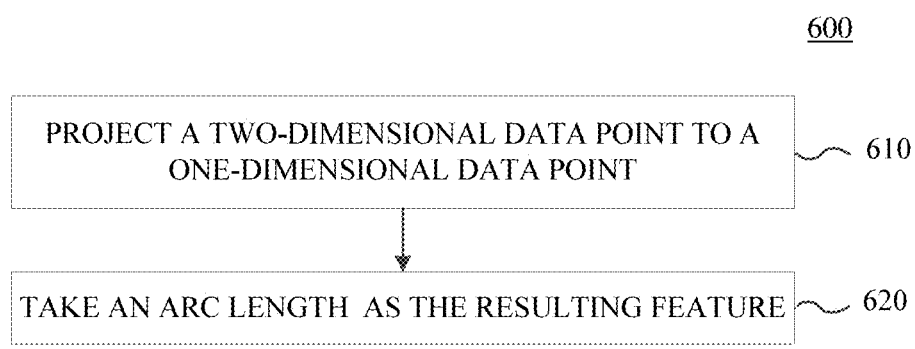
FIG. 6 depicts exemplary procedures of projecting according to an embodiment of the present disclosure.

FIG. 6 depicts exemplary procedures 600 of projecting in step 510 according to an embodiment of the present disclosure, which show how to project two input features to one resulting feature based on a specified curve. In the embodiment, step 510 can comprise step 610 and step 620. At step 610, the two input features can determine two values of two axes of a two-dimensional data point in a coordinate system respectively, for example, the two input features can be directly used as the two values. The two-dimensional data point can be projected to a one-dimensional data point on the specified curve. The one-dimensional data point is a data point on the specified curve which has the shortest distance to the two-dimensional data point. The shortest distance is referred to as an orthogonal distance herein. At step 620, an arc length from the one-dimensional data point to a start point in the specified curve can be taken as the resulting feature.

Next, a specific example will be described for the above steps 610-620 with respect to FIG. 7, which depicts projecting of two-dimensional data points to their corresponding one-dimensional data points on a specified curve according to an embodiment of the present disclosure.

Figure 7:
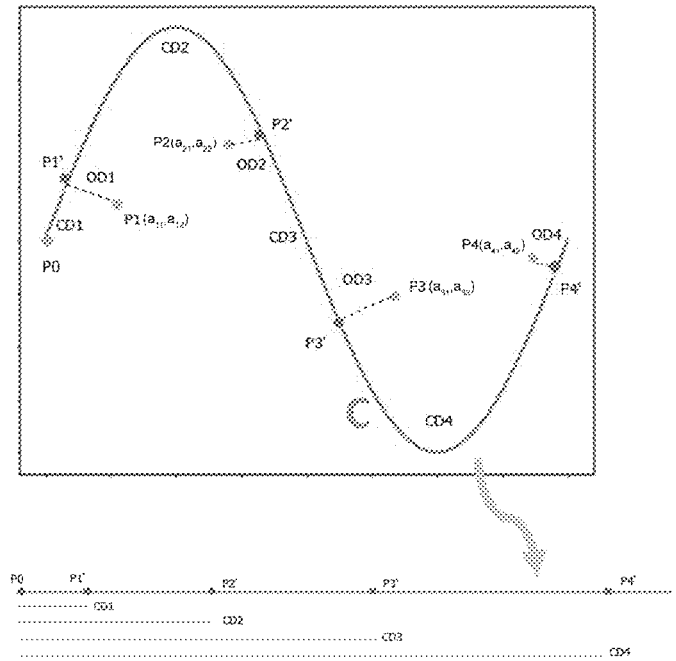
FIG. 7 depicts an example of projecting two-dimensional data points to their corresponding one-dimensional data points on a specified curve according to an embodiment of the present disclosure.

As can be seen from FIG. 7, two values of two axes of a two-dimensional data point P1 in a Cartesian coordinate system in the 2 dimensional space can be determined from two input features $a_{11}$ and $a_{12}$ of the first sample $A_1^N$ in the sample set AS respectively. Also, a two-dimensional data point P2 can be respectively determined from two input features $a_{21}$ and $a_{22}$ of the second sample $A_2^N$. In the same way, data points P3 and P4 corresponding to two input features of $A_3^N$ and $A_4^N$ respectively can be obtained.

The two-dimensional data point P1 can be projected to a one-dimensional data point P1' on a specific curve, for example, a sinusoidal curve C shown in FIG. 7. The one-dimensional data point P1' is a data point on the specified curve C which has an orthogonal distance OD1 to the two-dimensional data point P1. The orthogonal distance OD1 herein refers to the shortest distance among distances from the data point P1 to the sinusoidal curve C. One-dimensional data points P2', P3', P4' and corresponding orthogonal distances OD2, OD3, OD4 can be obtained in the same way.

Then, an arc length CD1 from the one-dimensional data point P1' to a start point P0 on the curve C can be taken as the resulting feature. In other words, the arc length CD1 can be used in step 520 to replace the two input features $a_{11}$ and $a_{12}$, resulting that the number of features of the sample $A_1^N$ is reduced by one, that is, $A_1^N$ is reduced to $A_1^{N-1}$. Please note that the start point P0 can be any point on the curve, for example a point whose value of the x-axis is 0. Likewise, an arc length CD2 from the one-dimensional data point P2' to the start point P0 can be obtained and used as the resulting feature to replace the two features $a_{21}$ and $a_{22}$ in the same way, resulting $A_2^{N-1}$. Similarly, arc lengths CD3 and CD4 can be obtained for $A_3^N$ and $A_4^N$. In this way, two features of each sample are projected into one resulting feature, and the number of features of each sample in the sample set AS after the updating in step 520 is reduced by one, resulting in an updated sample set AS'=$\{A_1^{N-1}, A_2^{N-1}, A_3^{N-1}, A_4^{N-1}\}$.

There are existing methods to calculate the orthogonal distance, for example, by directly solving equations or through vertical approximation or discretizing the curve to broken lines. There are also existing methods to calculate the arc length, for example through an arc length differential formula.

According to the embodiment related to FIG. 5, the sample set can be updated by replacing the two input features with the one resulting feature. Optionally, in order to get a better resulting feature to update the sample set, a limitation can be set to the resulting feature. Accordingly, an embodiment of the present disclosure can comprise a step of checking whether the resulting feature satisfies a predetermined condition, and if it does not, the step 510 can be re-done before updating the sample set, as shown in FIG. 8.

Figure 8:
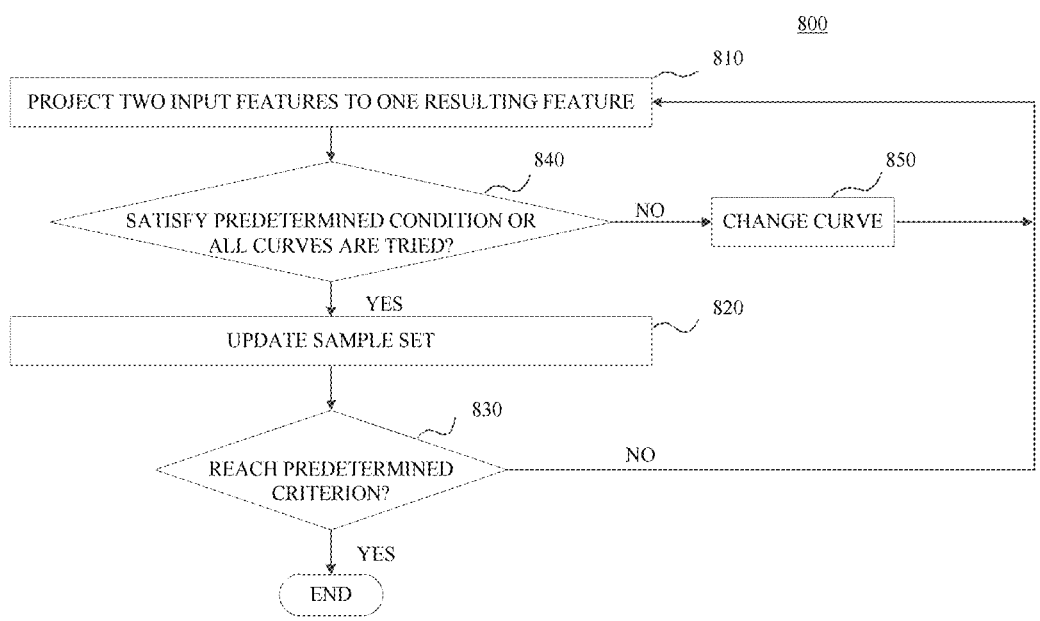
FIG. 8 depicts a flowchart of a method for feature processing according to another embodiment of the present disclosure.

Referring now to FIG. 8, it is shown a flowchart of a method 800 for feature processing according to another embodiment of the present disclosure. The method 800 can be implemented by one or more processing units, for example, implemented by computer system/server 12 or processing unit 16 of FIG. 1. Steps 810, 820 and 830 of FIG. 8 correspond to steps 510, 520 and 530 of FIG. 5 respectively. The descriptions for the above steps in FIG. 5 can also apply to corresponding steps in FIG. 8 unless otherwise indicated. The difference between the methods 800 and 500 is that method 800 further comprises steps 840 and 850. Details will be described based on FIG. 8 in the following.

At step 810, two input features selected from multiple features of each sample in a sample set can be projected to one resulting feature based on a specified curve.

At step 840, it can be determined whether the resulting feature satisfies a predetermined condition. Step 840 may ensure that the resulting feature satisfies the predetermined condition before being used to update the sample set. The predetermined condition herein may be a condition that requires the information of the input features is kept as much as possible in the process of the projecting. For example, the predetermined condition may require that that resulting features of different samples in the sample set are as discrete as possible.

If it is determined at step 840 that the resulting feature of step 810 satisfies the predetermined condition, then the resulting feature of step 810 can be used in step 820 to replace the two input features. If it is determined at step 840 that the resulting feature of step 810 does not satisfy the predetermined condition, the specified curve used in step 810 is changed to another curve from all available curves in step 850, and the projecting in step 810 is redone with said another curve, so as to find a suitable curve to obtain a resulting feature satisfying the predetermined condition. The available curves herein can refer to all curves that have been predefined to be used in the feature processing, and accordingly changing the specified curve among all available curves means that the specific curve used in the projecting of step 810 is changed to another curve from the available curves. Said another curve herein is different from the previously used specific curve. For example, it can be a different kind of curve or the same kind of curve with different parameters. For example, a sinusoidal curve which is used as the specified curve can be changed to a logarithmic curve or a parabola curve, or the sinusoidal curve can be changed to another sinusoidal curve with different coefficients. In some cases, all available curves have been tried to obtain the resulting feature, but a resulting feature satisfying the predetermined condition may still not be found. Under this circumstance, since no further curves can be used for redoing step 810, the process will proceed to step 820. In other words, at step 840, it is also determined whether all the available curves are tried, and if yes, the process also proceeds to step 820. At step 820, a resulting feature which is closest to the predetermined condition among all the resulting features generated during the performing of step 810 with different available curves can be used to replace the two input features.

At step 820, as stated above, in a case where a resulting feature satisfying the predetermined condition is found, the sample set can be updated by replacing the two input features with the resulting feature satisfying the predetermined condition for each sample in the sample set; otherwise, in a case where all available curves have been tried but a resulting feature satisfying the predetermined condition is still not found, the sample set can be updated by a resulting feature which is closest to the predetermined condition for each sample in the sample set.

At step 830, whether the number of features of each sample in the sample set reaches a predetermined criterion can be determined. If it is determined that the number of features of each sample in the sample set does not reach the predetermined criterion, the method 800 can return to step 810 to repeat the operations of steps 810, 840, 850 and 820; otherwise, if it is determined that the number of features of each sample in the sample set reaches the predetermined criterion, the method 800 can end.

In an embodiment, before the projecting in step 510 or 810 is performed, all the features of each sample can be normalized to be in a same range, for example, a range of [0, 1], which makes all features comparable.

In an embodiment, the specified curve in step 510 or 810 can be expressed by a function selected from a curve library. For example, the curve library can include several predefined functions, and each of them can be utilized to describe a curve in a 2 dimensional space. For example, the curves in the curve library can be:
a sinusoidal curve, which can be expressed by y=a·sin(x)+b;
a logarithmic curve, which can be expressed by $$y = a \cdot \ln x \frac{x}{b};$$

and
a parabola curve, which can be expressed by $y^2=2px$.

The available curves in step 850 can also be curves obtained through transforming, for example rotating, given curves in the curve library. There are existing methods for transforming a given curve, for example, by a given equation, function, or formula, or by a programming or engineering method such as mapping, or by changing parameters of the given curve.

According to embodiments of the present disclosure, the specified curve in step 510 or 810 can be selected manually or automatically from available curves. For manual selection, a user can determine which curve to be used in step 510 or 810 based on the application scenario according to the user's experience. For automatic selection, a selection strategy can be determined beforehand, and the process selects a curve automatically according to the predetermined strategy. For example, the specified curve can be selected from available curves in a curve library randomly or in a predetermined order. In a further embodiment, the available curves can be selected as the specified curve according to the relevance of the available curves to the application scenario. For example, if the feature processing is related to image processing and curves of a sinusoidal type may better fit the image processing, then sinusoidal curves will be selected preferably as the specified curve used in the projecting.

In an embodiment, the specified curve in step 510 or 810 can be the same or different each time the projecting is repeated after step 530 or 830, which means that the specific curve can be adapted according to the features to be processed, leading to better results in the projecting.

In method 800, a predetermined condition is applied to the resulting feature before it is used to update the sample set, and therefore a better resulting sample set with less information loss may be obtained by setting a suitable predetermined condition. In an embodiment, the predetermined condition in step 840 can be selected from a predefined objective library which includes some predefined objectives to evaluate the resulting feature. For example, the objectives can be related to relationship between the orthogonal distances and the arc lengths.

In an embodiment, the predetermined condition in step 840 may be that a ratio of variance of the orthogonal distances for all samples in the sample set to variance of the arc lengths for all samples in the sample set is lower than a threshold TH, i.e., $$\left(\frac{\sigma^2(OD)}{\sigma^2(CD)}\right) \leq TH.$$

In this embodiment, if the ratio satisfies the threshold TH, then the resulting feature can be used in step 820 to replace the two input features; otherwise, if the threshold TH is not satisfied, the specified curve is changed among all available curves in step 850 so as to find a suitable curve to obtain a resulting feature satisfying the predetermined condition. The projecting in step 810 is repeated until the threshold TH is satisfied. If all available curves are tried and the threshold TH is still not satisfied, then the curve with the minimum corresponding ratio is used as the specified curve to obtain the resulting feature to be used in step 820 to replace the two input features. The predetermined condition may ensure that the resulting features of all samples reflect the dispersion of corresponding input features of all samples more exactly, obtaining a better updated sample set.

In another embodiment, the predetermined condition in step 840 may be that the above mentioned ratio is minimum ratio for all the available curves, i.e., $$\min\left(\frac{\sigma^2(OD)}{\sigma^2(CD)}\right).$$

In this example, all the available curves need to be tried before it is determined which resulting features can be used to update the sample set, which ensures that the resulting features used in each time of updating the sample set reflect the dispersion of corresponding input features the best.

The predetermined condition in step 840 can be determined by default, by manual selection or by automatic selection. For example, the most commonly used condition for limiting resulting features according to practice can be set as a default predetermined condition, and method 800 will proceed with the default predetermined condition. As another option, a user can determine which condition to be used in step 840 and set it manually according to the user's experience. As a further option, the condition can be determined automatically from an objective library according to the application scenario of the process.

Figure 9A:
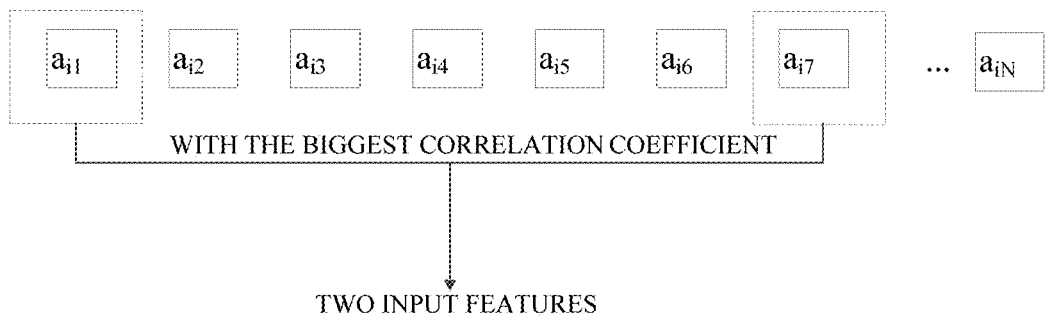
FIG. 9($a$) and FIG. 9($b$) depict exemplary feature selection strategies according to embodiments of the present disclosure.
Figure 9B:
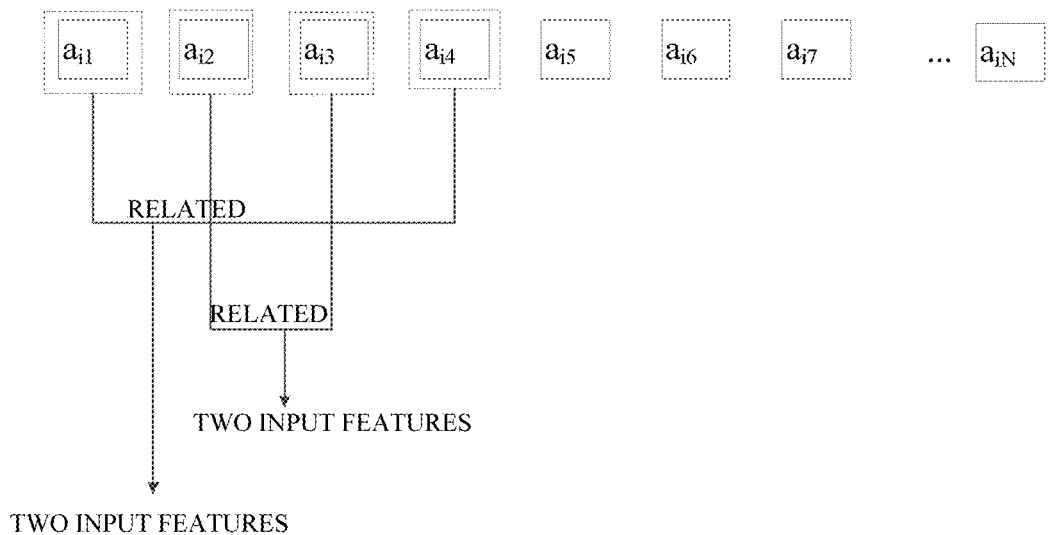

FIG. 9(*a*) and FIG. 9(*b*) depict exemplary feature selection strategies according to embodiments of the present disclosure. Based on the strategies, in the selection of the two input features from multiple features of each sample in the sample set, the two input features can be selected according to correlation between the multiple features of each sample. For example, two features with the biggest correlation coefficient among the multiple features can be selected first as the two input features and treated as a pair of values of two axes of a two-dimensional data point in a coordinate system in a 2 dimensional space for projecting. As shown in FIG. 9(*a*), assuming that the sample set is related to people, and the features of each sample include, for example, $a_{i1}$=years of age, $a_{i2}$=hair color, $a_{i3}$=marital status, $a_{i4}$=occupation, $a_{i5}$=phone number, $a_{i6}$=identity, $a_{i7}$=date of birth and so on. Among all the features, $a_{i1}$ and $a_{i7}$ are most related, then $a_{i1}$ and $a_{i7}$ can be selected first as the two input features. For another example, any two related features with a correlation coefficient bigger than a threshold can be selected first as the two input features and treated as a pair of values of two axes of a two-dimensional data point in a coordinate system in a 2 dimensional space for projecting. As shown in FIG. 9(*b*), assuming that the sample set is related to bank customer, and the features of each sample include, for example, $a_{i1}$=years of age, $a_{i2}$=years of employment, $a_{i3}$=income, $a_{i4}$=debit, $a_{i5}$=credit and so on. Among all the features, $a_{i1}$ and $a_{i4}$ are related. $a_{i2}$ and $a_{i3}$ are also related.

Then $a_{i1}$ and $a_{i4}$ can be selected as a pair of two input features, and $a_{i2}$ and $a_{i3}$ can also be selected as a pair of two input features. Which pair of features is selected as the two input features for projecting first can be determined randomly or by a further strategy, for example, in a natural order.

Figure 10:
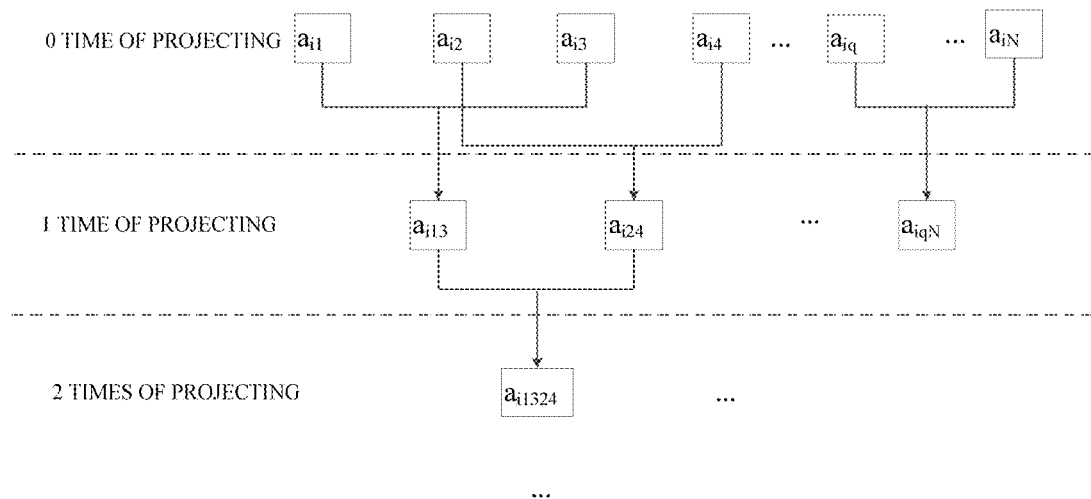
FIG. 10 depicts another exemplary feature selection strategy according to an embodiment of the present disclosure.

FIG. 10 depicts another exemplary feature selection strategy according to an embodiment of the present disclosure. Based on the strategy, in the selection of the two input features from multiple features of each sample, features subjected to the same times of projecting can be prioritized to be selected as the two input features. In this way, the features are selected pair by pair hierarchically. As shown in FIG. 10, original features $a_{i1}$ to $a_{iN}$ (features subjected to 0 time of projecting) are selected pair by pair as the two input features to subject to the projecting, resulting features $a_{i13}$, $a_{i24}$, . . . and $a_{iqN}$. After all original features have subjected to the projecting, the following projecting is performed on the resulting features $a_{i13}$, $a_{i24}$ and so on, which are features that have subjected to 1 time of projecting, resulting in features $a_{i1324}$ and so on. Likewise, after the projecting is performed on all features that have subjected to 1 time of projecting, the following projecting is performed on the resulting features such as $a_{i1324}$ and so on, which are features that have subjected to 2 times of projecting. The projecting continues to be performed in this hierarchical sequence until no more projecting needs to be done, that is, the number of features of each sample in the sample set reaches a predetermined criterion. Specially, in the process of the hierarchical selecting of the two input features, if there is only one feature left in the current hierarchical level without another corresponding feature subjected to the same time of projecting to pair with it, then the left one feature will be considered as a feature in the next hierarchical level as if it had been subjected to the projecting in the current level. For example, in FIG. 10, if there are odd number of features in the original sample set, i.e., in the top level, there will be no feature to pair with $a_{iN}$ in the top level. Then $a_{iN}$ will be considered as a feature in the second level to pair with a feature subjected to 1 time of projecting, for example, $a_{i24}$.

Figure 11:
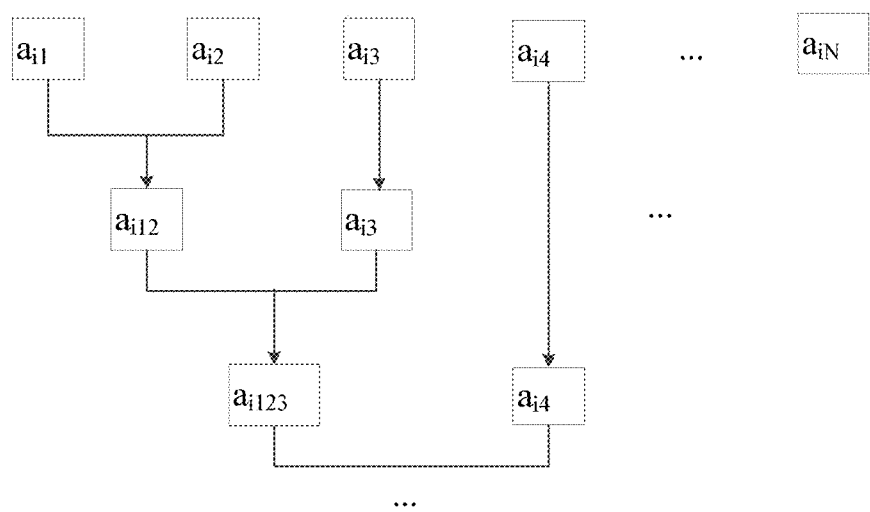
FIG. 11 depicts yet another exemplary feature selection strategy according to an embodiment of the present disclosure.

FIG. 11 depicts yet another exemplary feature selection strategy according to an embodiment of the present disclosure. Based on the strategy, when repeating the projecting, one of the two input features of each sample can be the resulting feature in the last updating, and the other of the two input features can be selected from the remaining features of each sample in the sample set. In this way, when repeating the projecting, one of the two input features is a feature that has subjected to at least one time of projecting, and the other one is an original feature that has subjected to no projecting. As shown in FIG. 11, original features, for example, $a_{i1}$ and $a_{i2}$ are firstly selected as the two input features to subject to the projecting, resulting one feature $a_{i12}$. Then, when repeating the projecting, feature $a_{i12}$ and another original feature $a_{i3}$ from the remaining features are selected as the two input features to subject to the projecting, resulting one feature $a_{i123}$. The projecting continues to be performed in this order until no more projecting needs to be done, that is, the number of features of each sample in the sample set reaches a predetermined criterion.

Please note that the feature selection strategies described above with respect to FIGS. 9(*a*) and 9(*b*) can be combined with the strategies described with respect to FIG. 10 or FIG. 11. Obviously, any other suitable strategies can also be used for feature selection.

In an embodiment, the sample set updated in step 520 or 820 can be saved in an intermediate storage and when the number of features of each sample in the sample set reaches a predetermined criterion, the updated sample set can be output.

It has been stated above that the present disclosure can be applied in the process of various fields, such as data mining, AI, machine learning and so on. Next, a specific example regarding a whole procedure of the method for feature processing according to an embodiment of the present application will be described with respect to FIGS. 12(a)-12(e), which depict an exemplary progressive reduction of dimensions of a sample set, to facilitate understanding of concept of embodiments of the present disclosure. In this specific example, the method according to the embodiment of the present disclosure will be applied in the field of data mining, in particular, in the field of bank customer loan risk analysis.

In order to reduce loan risk, a bank needs to build some models based on existing transaction records and customer information, so as to forecast the risk of the coming transactions or classify the customers for better service. A sample set used to build the models usually has dozens of, or even more features, which is difficult for analysis, visualization and modeling. The method according to the embodiment of the present disclosure can help to reduce the number of features of each sample in the sample set, while the details of the features are kept as more as possible.

The sample set comprises a plurality of samples, and Table 1 below shows 10 exemplary samples. As shown in Table 1, the exemplary samples are labeled as samples 1-10, and each sample consists of 6 exemplary features, which are "Age", "Employ", "Income", "Debit1", "Credit" and "Debit2" respectively. The feature of "age" represents the customer's age, the feature of "Employ" represents the years of the customer's employment, the feature of "Income" represents the customer's income, the feature of "Debit1" represents the customer's first debit, the feature of "Credit" represents the customer's credit, and the feature of "Debit2" represents the customer's second debit.

TABLE 1

| Sample | Age | Employ | Income | Debit1 | Credit | Debit2 |
| --- | --- | --- | --- | --- | --- | --- |
| 1 | 42 | 17 | 176 | 9.3 | 11.359 | 5.009 |
| 2 | 27 | 11 | 31 | 17.3 | 1.362 | 4.001 |
| 3 | 40 | 15 | 56 | 5.5 | 0.856 | 2.169 |
| 4 | 41 | 15 | 120 | 3.9 | 2.659 | 0.821 |
| 5 | 24 | 2 | 28 | 17.3 | 2.787 | 3.057 |
| 6 | 41 | 5 | 25 | 10.2 | 0.393 | 2.225 |
| 7 | 39 | 20 | 67 | 30.6 | 3.446 | 16.668 |
| 8 | 43 | 12 | 38 | 3.12 | 0.129 | 1.239 |
| 9 | 24 | 2 | 29 | 24.4 | 1.358 | 3.278 |
| 10 | 33 | 0 | 25 | 19.7 | 2.778 | 2.147 |

In this example, the target is to reduce the number of features from 6 to 2. According to statistics of correlation coefficients of the features, the below pairs of features are with big correlation coefficients respectively: (1) Credit and Debit2; (2) Employ and Income; and (3) Age and Debit1. Also, it is determined that a combination of the strategies for feature selection described above with respect to FIG. 9(b) and FIG. 10 are used. Therefore, each pair of the above features can be selected as the two input features for projecting, and the projecting is done hierarchically. In addition, a sinusoidal curve, which is expressed by $y=1/2*(\sin(2\pi x)+1)$, where $0 \leq x \leq 1$, is used for projecting in the method, and before every projecting, the features of each sample are normalized to be in a range of [0, 1].

Figure 12A:
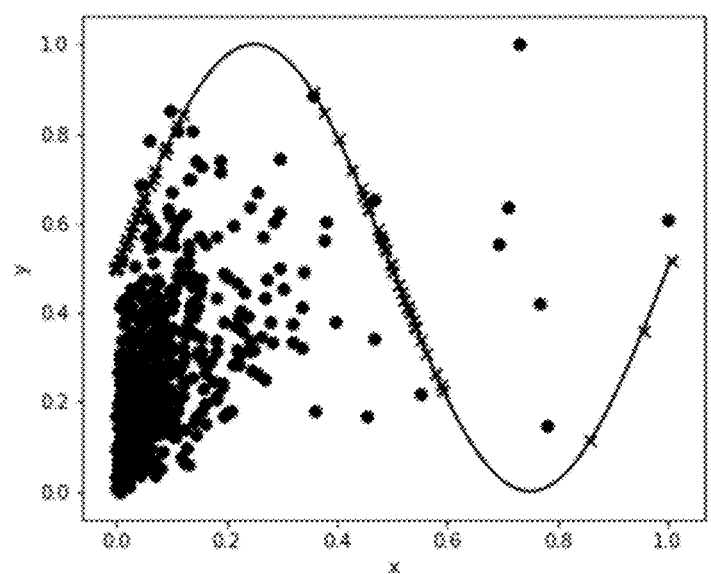
FIGS. 12($a$)-12($e$) depict an exemplary progressive reduction of dimensions of a sample set according to an embodiment of the present disclosure.

Referring to FIG. 12(a), at first, the projecting is performed to the first pair of features Credit and Debit2. Each round dot in the two dimensional space of FIG. 12(a) represents a two-dimensional data point, whose value of the x-axis is determined from the feature Credit of a corresponding sample, and whose value of the y-axis is determined from the feature Debit2 of the corresponding sample. Each cross on the curve in FIG. 12(a) represents a one-dimensional data point by projecting a corresponding two-dimensional data point onto the curve. An arc length from a one-dimensional data point to a start point whose value of the x-axis is 0 in the sinusoidal curve is taken as a resulting feature, and the sample set is updated by replacing the two features Credit and Debit2 with the one resulting feature for each sample. In this way, the number of features of each sample in the sample set is reduced by 1, that is, the dimensions of the sample set are reduced from 6 to 5.

Figure 12B:
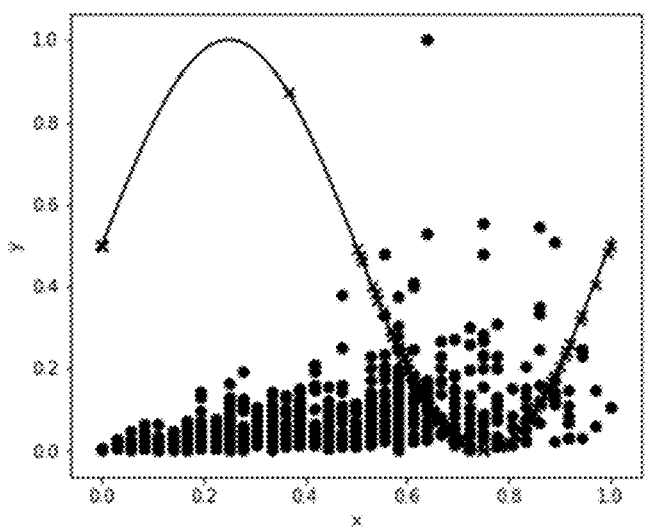

Referring to FIG. 12(b), the projecting is performed to the second pair of features Employ and Income. Each round dot in the two dimensional space of FIG. 12(b) represents a two-dimensional data point, whose value of the X axis is determined from the feature Employ of a corresponding sample, and whose value of the y-axis is determined from the feature Income of the corresponding sample. Each cross on the curve in FIG. 12(b) represents a one-dimensional data point by projecting a corresponding two-dimensional data point onto the curve. An arc length from a one-dimensional data point to the start point in the sinusoidal curve is taken as a resulting feature, and the sample set can be updated by replacing the two features Employ and Income with the one resulting feature for each sample. In this way, the number of features of each sample in the sample set is reduced by 1 once more, that is, the dimensions of the sample set are reduced from 5 to 4.

Figure 12C:
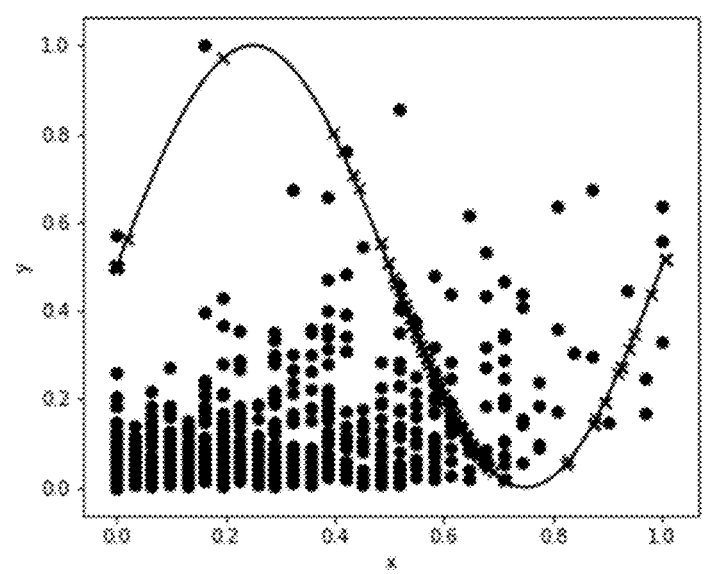

Referring to FIG. 12(c), in the following, the projecting is performed to the third pair of features Age and Debit1. Each round dot in the two dimensional space of FIG. 12(c) represents a two-dimensional data point, whose value of the x-axis is determined from the feature Age of a corresponding sample, and whose value of the y-axis is determined from the feature Debit1 of the corresponding sample. Each cross on the curve in FIG. 12(c) represents a one-dimensional data point by projecting a two-dimensional data point onto the curve. An arc length from a one-dimensional data point to the start point in the sinusoidal curve can be taken as a resulting feature, and the sample set is updated by replacing the two features Age and Debit1 with the one resulting feature for each sample. In this way, the number of features of each sample in the sample set is reduced by 1 once more, that is, the dimensions of the sample set are reduced from 4 to 3.

Figure 12D:
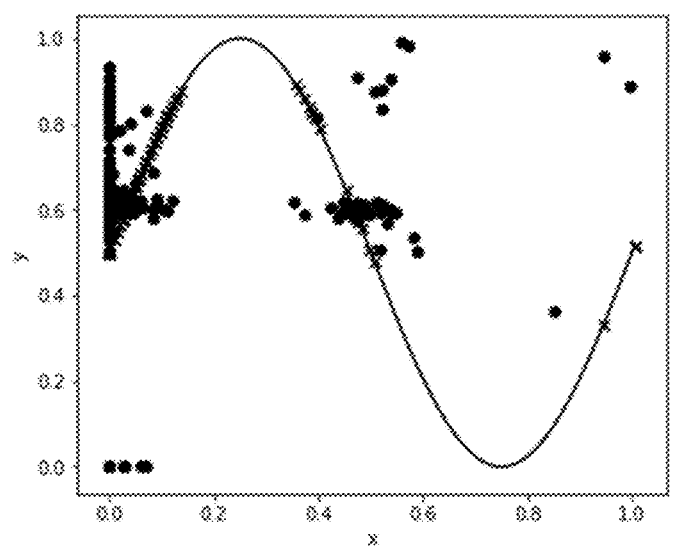

Referring to FIG. 12(d), in the following, the projecting is performed to the feature resulted from the first pair of features Credit and Debit2 and the feature resulted from the second pair of features Employ and Income. Each round dot in the two dimensional space of FIG. 12(d) represents a two-dimensional data point, whose value of the x-axis is determined from the feature resulted from the first pair of features Credit and Debit2, and whose value of the y-axis is determined from the feature resulted from the second pair of features Employ and Income. Each cross on the curve in FIG. 12(d) represents a one-dimensional data point by projecting a two-dimensional data point onto the curve. An arc length from a one-dimensional data point to the start point in the sinusoidal curve is taken as a resulting feature, and the sample set can be updated by replacing the two features resulted from the first pair and the second pair of features with the one resulting feature for each sample. In this way, the number of features of each sample in the sample set is reduced by 1 once more, that is, the dimensions of the sample set are reduced from 3 to 2, and a resulting sample set with the predetermined dimensions is thus obtained.

Figure 12E:
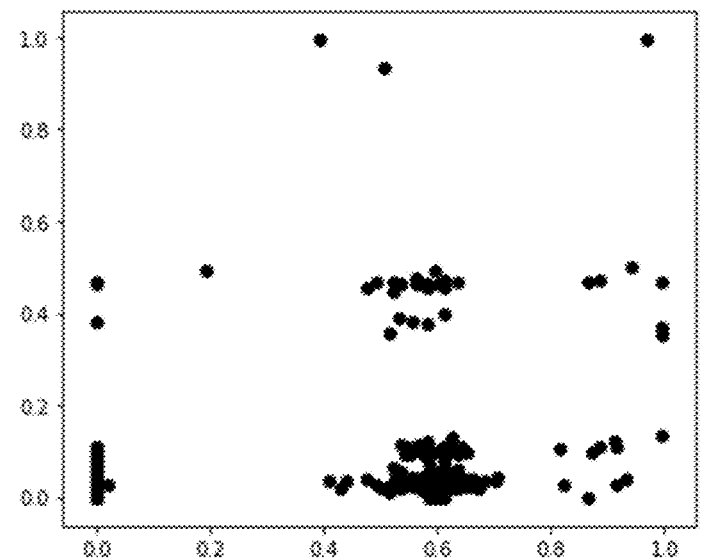

FIG. 12(e) depicts the distribution of the two features of the samples in the resulting sample set in a 2 dimensional space, and the features are normalized to be in the range of [0, 1]. As can be seen from FIG. 12(e), the dots determined from the two features are basically distributed in 6 clusters, and the bank can use the resulting sample set for data visualization, and/or take it as an input for other data mining or computer modeling so as to archive their business goals.

The method for feature processing according to embodiments of the present disclosure can also be used in other applications such as image recognition, voice recognition, and natural language processing (NLP), among others. In image recognition, an image sample set is often high dimensional, and can even have hundreds of features. Usually, each pixel of an image will be recorded as a record while there can be 2000*1000 pixels on the image. Therefore, dimension reduction can often be an important step. Dimension reduction will cause losing details, which will reduce the accuracy of recognition. The method for feature processing according to embodiments of the present disclosure may keep details as more as possible, which will significantly improve the efficiency and accuracy of the image recognition. For voice recognition and (NLP), there will also be very high dimensional sample sets. For example, texts are usually presented as a very big collection of vectors. The method for feature processing according to embodiments of the present disclosure may keep details as more as possible.

When the method for feature processing according to embodiments of the present disclosure is applied to a specific application field, the sample set and the features in the method will refer to a specific sample set and related features. For example, for the application of image recognition, an embodiment of the present disclosure provides a computer-implemented method for image feature processing, comprising: projecting two input image features selected from multiple image features of each image sample in an image sample set to one resulting image feature based on a specified curve; updating the image sample set by replacing the two input image features with the one resulting image feature for each image sample in the image sample set; and repeating the projecting and the updating for the image sample set until the number of features of each image sample in the image sample set reaches a predetermined criterion. For the application of voice recognition, an embodiment of the present disclosure provides a computer-implemented method for voice feature processing, comprising: projecting two input voice features selected from multiple voice features of each voice sample in a voice sample set to one resulting voice feature based on a specified curve; updating the voice sample set by replacing the two input voice features with the one resulting voice feature for each voice sample in the voice sample set; and repeating the projecting and the updating for the voice sample set until the number of features of each voice sample in the voice sample set reaches a predetermined criterion. For the application of natural language processing, an embodiment of the present disclosure provides a computer-implemented method for text feature processing, comprising: projecting two input text features selected from multiple text features of each text sample in a text sample set to one resulting text feature based on a specified curve; updating the text sample set by replacing the two input text features with the one resulting text feature for each text sample in the text sample set; and repeating the projecting and the updating for the text sample set until the number of features of each text sample in the text sample set reaches a predetermined criterion.

It should be noted that processing of the method for feature processing described above can be implemented by computer system/server 12 or processing unit 16 of FIG. 1, or on a plurality of cloud computing nodes 10 each including computer system/server 12 or processing unit 16 as shown in FIG. 1.

Based on the method for feature processing according to an embodiment of the present disclosure, the dimensions of the sample set can be reduced based on specified curves progressively. Therefore, more information of the samples can be remained after the process by specifying a suitable curve for each reduction step, and the number of features of the output sample set can be easily adjusted case by case, resulting in more effective solutions for feature processing. Meanwhile, the method or system has no limitations on data types, and thus it can be used universally, for example, for both non-linear data and linear data. In addition, the method needs no training and works progressively, leading to low CPU and memory requirements.

Figure 13:
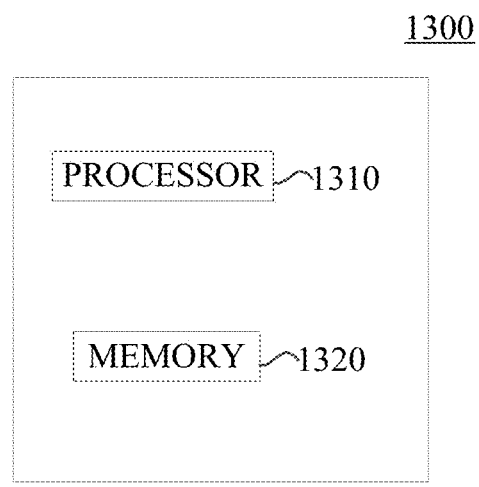
FIG. 13 depicts a system for feature processing according to an embodiment of the present disclosure.

Referring now to FIG. 13, there is shown a system 1300 for feature processing according to an embodiment of the present disclosure. The system 1300 for feature processing comprises one or more processors 1310 and a memory 1320 coupled to at least one of the processors 1310. A set of computer program instructions are stored in the memory 1320. When executed by at least one of the processors 1310, the set of computer program instructions perform following series of actions for feature processing. Two input features selected from multiple features of each sample in a sample set can be projected to one resulting feature based on a specified curve. The sample set can be updated by replacing the two input features with the one resulting feature for each sample in the sample set. The projecting and the updating for the sample set can be repeated until the number of features of each sample in the sample set reaches a predetermined criterion.

The system 1300 in FIG. 13 can be implemented by a computer system/server 12 or processing unit 16 of FIG. 1, and can additionally include I/O interface, network adapter, etc. In addition, the system 1300 may be implemented on a plurality of cloud computing nodes 10 each including computer system/server 12 or processing unit 16 as shown in FIG. 1.

In an embodiment, the specified curve can be expressed by a function selected from a curve library.

In an embodiment, before the sample set is updated by replacing the two input features with the one resulting feature, the set of computer program instructions perform the following actions. In response to that the resulting feature does not satisfy a predetermined condition, the projecting through changing the specified curve among available curves is redone until a resulting feature satisfying the predetermined condition is found or all of the available curves are tried. In the embodiment, the sample set can be updated with the resulting feature satisfying the predetermined condition or a resulting feature which is closest to the predetermined condition.

In an embodiment, a two-dimensional data point can be projected to a one-dimensional data point on the specified curve, herein two values of two axes of the two-dimensional data point in a coordinate system are respectively determined from the two input features, and the one-dimensional data point is a data point on the specified curve which has the shortest distance to the two-dimensional data point as an orthogonal distance. An arc length from the one-dimensional data point to a start point in the specified curve can be taken as the resulting feature.

In an embodiment, the predetermined condition can be that a ratio of variance of the orthogonal distances for all samples in the sample set to variance of the arc lengths for all samples in the sample set is lower than a threshold or is minimum ratio for all the available curves.

In an embodiment, the two input features can be selected from the multiple features of each sample according to correlation between the multiple features.

In an embodiment, features subjected to the same times of projecting can be prioritized to be selected as the two input features.

In an embodiment, when the projecting is repeated, one of the two input features of each sample can be the resulting feature in the last updating, and the other of the two input features can be selected from the remaining features of each sample in the sample set.

In an embodiment, the available curves can be selected as the specified curve randomly, or in a predetermined order, or according to the relevance of the available curves to an application scenario.

The descriptions above related to the process of method 500 or method 800 can be applied to system 1300, details are omitted herein for conciseness.

Figure 14:
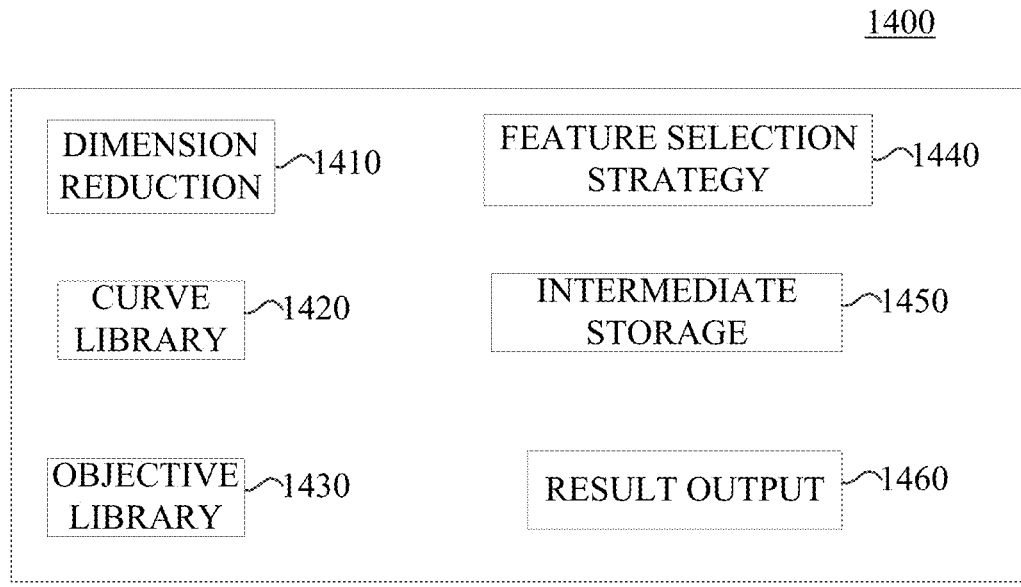
FIG. 14 depicts a system for feature processing according to another embodiment of the present disclosure.

Referring now to FIG. 14, there is shown a system 1400 for feature processing according to an embodiment of the present disclosure. The system 1400 in FIG. 14 can be implemented by a computer system/server 12 or processing unit 16 of FIG. 1, and can additionally include I/O interface, network adapter, etc. In addition, the system 1400 may be implemented on a plurality of cloud computing nodes 10 each including computer system/server 12 or processing unit 16 as shown in FIG. 1.

As shown in FIG. 14, the system 1400 for feature processing can comprise a dimension reduction component 1410, which is configured to project two input features selected from multiple features of each sample in a sample set to one resulting feature based on a specified curve, to update the sample set by replacing the two input features with the one resulting feature for each sample in the sample set, and to repeat the projecting and the updating for the sample set until the number of features of each sample in the sample set reaches a predetermined criterion.

As shown in FIG. 14, the system 1400 for feature processing can further comprise a curve library component 1420, and the specified curve is expressed by a function selected from the curve library component 1420.

As shown in FIG. 14, the system 1400 for feature processing can further comprise an objective library component 1430, and the dimension reduction component 1410 is further configured to, in response to that the resulting feature does not satisfy a predetermined condition selected from the objective library component 1430, redo the projecting through changing the specified curve among available curves until a resulting feature satisfying the predetermined condition is found or all of the available curves are tried; and update the sample set with the resulting feature satisfying the predetermined condition or a resulting feature which is closest to the predetermined condition.

In an embodiment, in the projecting of two input features selected from multiple features of each sample in the sample set to one resulting feature based on the specified curve, the dimension reduction component 1410 is further configured to project a two-dimensional data point to a one-dimensional data point on the specified curve, wherein two values of two axes of the two-dimensional data point in a coordinate system are respectively determined from the two input features, and the one-dimensional data point is a data point on the specified curve which has the shortest distance to the two-dimensional data point as an orthogonal distance; and take an arc length from the one-dimensional data point to a start point in the specified curve as the resulting feature.

In an embodiment, the predetermined condition is that a ratio of variance of the orthogonal distances for all samples in the sample set to variance of the arc lengths for all samples in the sample set is lower than a threshold or is minimum ratio for all the available curves.

As shown in FIG. 14, the system 1400 for feature processing can further comprise a feature selection strategy component 1440 to store and load feature selection strategies. In an embodiment, the feature selection strategy component 1440 is configured to define that the two input features are selected from the multiple features of each sample according to correlation between the multiple features.

In an embodiment, the feature selection strategy component 1440 is configured to define that features subjected to the same times of projecting are prioritized to be selected as the two input features.

In an embodiment, the feature selection strategy component 1440 is configured to define that when repeating the projecting, one of the two input features of each sample is the resulting feature in the last updating, and the other of the two input features is selected from the remaining features of each sample in the sample set.

In an embodiment, the available curves are selected as the specified curve randomly, or in a predetermined order, or according to the relevance of the available curves to an application scenario.

As shown in FIG. 14, the system 1400 for feature processing can further comprise an intermediate storage component 1450, which is configured to save the sample set each time it is updated by the dimension reduction component 1410.

As shown in FIG. 14, the system 1400 for feature processing can further comprise a result output component 1460, which is configured to output the updated sample set when the number of features of each sample in the sample set reaches the predetermined criterion.

The descriptions above related to the process of method 500 or method 800 can be applied to system 1400, details are omitted herein for conciseness.

According to another embodiment of the present disclosure, a computer program product for feature processing is disclosed. As an example, the computer program product comprises a non-transitory computer readable storage medium having program instructions embodied therewith, and the program instructions are executable by a processor. When executed, the program instructions cause the processor to perform one or more of the above described procedures.

The sequence of actions described in connection with the Figures is only exemplary, and cannot be construed as a limitation to the present disclosure. When necessary, the sequence of actions can be modified. In addition, one or more actions can be omitted, and more action can be added.

It should be noted that the processing of the method for feature processing (or achieved by the system for feature processing) according to embodiments of this disclosure could be implemented by computer system/server 12 or processing unit 16 of FIG. 1.

The present disclosure may be a system, a method, and/or a computer program product at any possible technical detail level of integration. The computer program product may include a non-transitory computer readable storage medium (or media) having computer readable program instructions thereon for causing a processor to carry out aspects of the present disclosure.

The non-transitory computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for feature processing, comprising:
    projecting, by one or more processing units, two input image recognition features selected from multiple features of each sample in a sample set to one resulting feature based on a specified curve, wherein the projecting the two input image recognition features comprises:
        projecting, by one or more processing units, a two-dimensional data point to a one-dimensional data point on the specified curve, wherein two values of two axes of the two-dimensional data point in a coordinate system are respectively determined from the two input image recognition features, and the one-dimensional data point is a data point on the specified curve which has the shortest distance to the two-dimensional data point as an orthogonal distance, and
        determining, by one or more processing units, an arc length from the one-dimensional data point to a start point in the specified curve as the resulting feature;
    updating, by one or more processing units, the sample set by replacing the two input image recognition features with the one resulting feature for each sample in the sample set; and
    repeating, by one or more processing units, the projecting and the updating for the sample set until the number of features of each sample in the sample set reaches a predetermined criterion.

2. The computer-implemented method of claim 1, wherein the specified curve is expressed by a function selected from a curve library.

3. The computer-implemented method of claim 1, further comprising:
    responsive to the resulting feature not satisfying a predetermined condition, projecting, by one or more processing units, the two input image recognition features through changing the specified curve among available curves until an updated resulting feature satisfying the predetermined condition is found or all of the available curves are tried,
    wherein the updating the sample set by replacing the two input image recognition features with the one resulting feature comprises:
    updating, by one or more processing units, the sample set with the updated resulting feature satisfying the predetermined condition or an updated resulting feature which is closest to the predetermined condition.

4. The computer-implemented method of claim 3, wherein the predetermined condition is that a ratio of variance of the orthogonal distances for all samples in the sample set to variance of the arc lengths for all samples in the sample set is lower than a threshold.

5. The computer-implemented method of claim 1, wherein the two input image recognition features are selected from the multiple features of each sample according to correlation between the multiple features.

6. The computer-implemented method of claim 1, wherein features subjected to the same times of projecting are prioritized for selection as the two input image recognition features.

7. The computer-implemented method of claim 1, wherein when repeating the projecting, one of the two input image recognition features of each sample is the resulting feature in the previous updating, and the other of the two input image recognition features is selected from the remaining features of each sample in the sample set.

8. The computer-implemented method of claim 3, wherein the available curves are selected as the specified curve according to one of the following: (i) randomly, (ii) in a predetermined order, or (iii) according to the relevance of the available curves to a present application scenario.

9. A system for feature processing, comprising:
    one or more processors;
    a computer readable storage medium coupled to at least one of the processors; and
    computer code stored on the computer readable storage medium, with the computer code including instructions for causing at least one of the processors to perform operations including the following:
    projecting two input image recognition features selected from multiple features of each sample in a sample set to one resulting feature based on a specified curve, wherein the projecting the two input image recognition features comprises:
        projecting a two-dimensional data point to a one-dimensional data point on the specified curve, wherein two values of two axes of the two-dimensional data point in a coordinate system are respectively determined from the two input image recognition features, and the one-dimensional data point is a data point on the specified curve which has the shortest distance to the two-dimensional data point as an orthogonal distance, and
        determining an arc length from the one-dimensional data point to a start point in the specified curve as the resulting feature,
    updating the sample set by replacing the two input image recognition features with the one resulting feature for each sample in the sample set, and
    repeating the projecting and the updating for the sample set until the number of features of each sample in the sample set reaches a predetermined criterion.

10. The system of claim 9, wherein the specified curve is expressed by a function selected from a curve library.

11. The system of claim 9, wherein the computer code further includes instructions for causing the one or more processors to perform the following operations:
    responsive to the resulting feature not satisfying a predetermined condition, projecting, by one or more processing units, the two input image recognition features through changing the specified curve among available curves until an updated resulting feature satisfying the predetermined condition is found or all of the available curves are tried,
    wherein the updating the sample set by replacing the two input image recognition features with the one resulting feature comprises:
    updating, by one or more processing units, the sample set with the updated resulting feature satisfying the predetermined condition or an updated resulting feature which is closest to the predetermined condition.

12. The system of claim 11, wherein the predetermined condition is that a ratio of variance of the orthogonal distances for all samples in the sample set to variance of the arc lengths for all samples in the sample set is lower than a threshold.

13. The system of claim 9, wherein the two input image recognition features are selected from the multiple features of each sample according to correlation between the multiple features.

14. The system of claim 9, wherein features subjected to the same times of projecting are prioritized for selection as the two input image recognition features.

15. The system of claim 9, wherein when repeating the projecting, one of the two input image recognition features of each sample is the resulting feature in the previous updating, and the other of the two input image recognition features is selected from the remaining features of each sample in the sample set.

16. The system of claim 11, wherein the available curves are selected as the specified curve according to one of the following: (i) randomly, (ii) in a predetermined order, or (iii) according to the relevance of the available curves to a present application scenario.

17. A computer program product for feature processing, the computer program product comprising:
   a computer readable storage medium; and
   computer code stored on the computer readable storage medium, with the computer co de including instructions for causing one or more processors to perform operations including the following:
      project two input image recognition features selected from multiple features of each sample in a sample set to one resulting feature based on a specified curve, wherein the projecting the two input image recognition features comprises:
         project at wo-dimensional data point to a one-dimensional data point on the specified curve, wherein two values of two axes of the two-dimensional data point in a coordinate system are respectively determined from the two input image recognition features, and the one-dimensional data point is a data point on the specified curve which has the shortest distance to the two-dimensional data point as an orthogonal distance, and
         determine an arc length from the one-dimensional data point to a start point in the specified curve as the resulting feature,
      update the sample set by replacing the two input image recognition features with the one resulting feature for each sample in the sample set, and
      repeat the projecting and the updating for the sample set until the number of features of each sample in the sample set reaches a predetermined criterion.

18. The computer program product of claim 17, wherein the computer code further includes instructions for causing the one or more processors to perform the following operations:
   responsive to the resulting feature not satisfying a predetermined condition, projecting, by one or more processing units, the two input image recognition features through changing the specified curve among available curves until an updated resulting feature satisfying the predetermined condition is found or all of the available curves are tried,
   wherein the updating the sample set by replacing the two input image recognition features with the one resulting feature comprises:
   updating, by one or more processing units, the sample set with the updated resulting feature satisfying the predetermined condition or an updated resulting feature which is closest to the predetermined condition.

\* \* \* \* \*